United States Patent [19]
DeLange et al.

[11] Patent Number: 5,931,511
[45] Date of Patent: Aug. 3, 1999

[54] THREADED CONNECTION FOR ENHANCED FATIGUE RESISTANCE

[75] Inventors: Richard DeLange, Kingwood; Ed Evans, Spring; Jerry L. Buster, Houston, all of Tex.

[73] Assignee: Grant Prideco, Inc., The Woodlands, Tex.

[21] Appl. No.: 08/850,735

[22] Filed: May 2, 1997

[51] Int. Cl.⁶ .................................................. F16L 15/00
[52] U.S. Cl. .......................... 285/334; 285/333; 285/355
[58] Field of Search ................................... 285/333, 334, 285/355, 390

[56] References Cited

U.S. PATENT DOCUMENTS

| | | | |
|---|---|---|---|
| 2,893,759 | 7/1959 | Blose | 285/334 |
| 3,508,771 | 4/1970 | Duret | 285/334 |
| 4,113,290 | 9/1978 | Miida | 285/334 |
| 4,494,777 | 1/1985 | Duret | 285/334 |
| 4,508,375 | 4/1985 | Patterson et al. | 285/334 |
| 4,549,754 | 10/1985 | Saunders et al. | 285/334 |
| 4,708,513 | 11/1987 | Roche et al. | 403/361 |
| 4,928,999 | 5/1990 | Landriault et al. | 285/113 |
| 5,056,611 | 10/1991 | Yousef et al. | 285/334 |
| 5,092,635 | 3/1992 | Delange et al. | 285/334 |
| 5,419,595 | 5/1995 | Yamamoto | 285/334 |

FOREIGN PATENT DOCUMENTS

| | | | |
|---|---|---|---|
| 92015815 | 9/1992 | WIPO | 285/334 |

Primary Examiner—Eric K. Nicholson
Attorney, Agent, or Firm—Browning Bushman

[57] ABSTRACT

A threaded connection for improving fatigue resistance to cyclic loading is disclosed. The threaded connection basically comprises a pair of interlocking members having corresponding radially inner and radially outer spiral threads thereon, each spiral thread including a spiral compression flank and a spiral tension flank wherein at least one of the spiral compression flanks and spiral tension flanks on the inner spiral threads are in mating planar engagement with a corresponding spiral compression flank and spiral tension flank on the outer spiral thread. Axial spacing between the tension flanks and the compression flanks on the radially inner and radially outer spiral threads further define a stress reducing spiral root surface on at least one of the radially inner and radially outer threads and a corresponding crest surface on the other radially inner and radially outer spiral threads. Resistance to cyclic loading on the threaded connection is improved because of the stress reducing spiral root surface which includes a substantially linear profile spaced axially between the compression flank of one thread and a tension flank of an adjoining thread. The stress reducing spiral root surface intersects the compression flank and tension flank along corresponding first and second axially spaced rounded surfaces each having a radius of at least 0.015 inches. Loading is therefore, distributed evenly over the threads rather than being concentrated at what normally would be a sharp juncture formed in the root of the thread.

20 Claims, 2 Drawing Sheets

THREADED CONNECTION FOR ENHANCED FATIGUE RESISTANCE

FIELD OF THE INVENTION

The present invention relates to a threaded connection for enhancing fatigue resistance to cyclic loading and, more particularly, to an oilfield threaded connection tubular with improved performance during cyclic loading of threadedly connected oilfield tubulars during downhole operations.

BACKGROUND OF THE INVENTION

Specially designed threaded connections for interlocking oilfield tubular members are commonly used during production and drilling operations in the petroleum industry. The threaded connections usually consist of a male pin member which makes up into a female box member, but may alternatively employ a coupling which is threaded at both ends for interlocking two tubular members. The interlocking tubular members when manipulated downhole within drilling and/or production operations are subjected to various tensile, compressive and shear forces resulting in fatigue and ultimate failure of the weaker threaded connection. Therefore, various specially designed threads for improving fatigue resistance have been used in the prior art for both drilling applications (drill pipe and tool joints) and production applications (marine risers and casing).

Among the most important characteristics for downhole tubulars is the mechanical ability of the threaded connections to resist tension, compression and bending loads. Other important characteristics include dependable pressure sealing capabilities from either inside or outside the tubular, regardless of mechanical loading, and special geometries such that the connection exterior surface is flush with either or both the outside diameter and inside diameter of the tubular. Downhole tubular connections used in completion operations are not ordinarily subjected to cyclic loading which can cause fatigue and therefore, are not typically designed to resist such loading. Tubular connections used in completion operations frequently utilize square or four-sided thread forms which resist mechanical loading while requiring a minimum of space and material. These thread forms normally incorporate sharp radii between intersecting thread faces that may work well for some downhole completion operations, but act as concentrated stress points which can initiate fatigue cracking when the tubular string is moved through a load in the well bore.

Drill pipe is normally used to drill wells by rotation, making fatigue resistance important. The evolution of fatigue resistant drill pipe has resulted in drill pipe connectors that are significantly greater in diameter than the pipe body, generally making these connections impracticable and uneconomical for downhole completion operations. Drill pipe connections are also designed with very little pressure sealing capability.

Consequently, risers have been used over the years to accommodate fatigue resistant connections in downhole completion applications, such as deep water drilling. Risers are protective casing strings that can experience mechanical loading from the water and from the rig, and provide dependable pressure sealing. Risers are normally subjected to fatigue loading situations and, like drill pipe connections, must be resistant to fatigue or cyclic loading.

Thread designs for tool joints are typically restricted by their application to drilling operations, which makes their use in production risers and related applications counter-productive to improving fatigue resistance. For example, U.S. Pat. No. 4,549,754 to Saunders et al. discloses a threaded tool joint for reducing stress and improving fatigue resistance. However, since the tool joint distributes uneven loads, the result is more stress on the threads farthest from the pin shoulder.

U.S. Pat. No. 4,708,513 to Roche et al. discloses an extended lift coupling for joining tubular members in end-to-end relationship for improved fatigue resistance caused by applied cyclic tensile forces. An external compressive axial preload places a torus on a pin in axial compression. Make-up of a lock ring maintains the compressive strain on the torus and the lock ring when the axial make-up force is removed. Increased tensile loading is partially absorbed in benign compressive stress by the locking ring, which does not improve fatigue resistance caused by radial bending of the tubular members. Nevertheless, downhole connections offer most of the characteristics designed for risers, such as pressure integrity, resistance to high mechanical loads and economical costs, but not fatigue resistance. Therefore, to meet various riser application needs, most riser systems have used expensive connections manufactured on heavy wall material, which is then welded to the pipe, and result in a very expensive solution to solving the fatigue resistance problem.

The disadvantages of the prior art are overcome by the present invention and a threaded connection is hereinafter disclosed for use in oilfield tubulars, and in particular in risers, with improved fatigue resistance.

SUMMARY OF THE INVENTION

The present invention incorporates a novel thread design for downhole tubular connections used in drilling, production and/or completion applications. The threaded connection will either consist of a male pin member which makes up into a female box member, or alternatively, a coupling which is threaded at both ends for interlocking two tubular members. The novel thread design of the present invention uses a tapered thread and reduces stress concentration points in the bottom of the thread roots by increasing the radii at the intersection between the thread roots and the sides of the thread or flanks.

Because oilfield tubular completion connections are compact in design, there is little room to expand the radius of the thread root to thread flank intersection without reducing other important features, such as contact area between the load-carrying thread flanks. The present invention allows for an increase of the radii by deepening the thread root depth. This modification slightly decreases the tensile strength of the tubular connections which are rarely more than 5,000 feet long. Since these tubular downhole connections are able to carry loads generated from string lengths of more than 15,000 ft.–18,000 ft., a small reduction in tensile strength is permissible.

The novel thread design of the present invention preferably engages both the compression flanks and the tension flanks. However, if only the tension flanks are engaged, the torque shoulder area must carry the compression loading while the thread body carries the tension loading. The enlarged radii and flank-to-flank contact of the present invention create a mostly rigid thread body which not only reduces stress concentration points in the thread roots, but also enhances the tubular connection transmitting heavy mechanical loading across the engaged thread region.

Accordingly, the threaded connection of the present invention for enhanced fatigue resistance to cyclic loading of threadably connected oilfield tubulars includes a pair of interlocking threaded members with corresponding radially inner and radially outer spiral threads thereon, each spiral thread, thereby including a spiral compression flank and a spiral tension flank. At least one of the spiral compression flanks and spiral tension flanks on the inner spiral threads is engaged with a corresponding spiral compression flank and spiral tension flank on the outer spiral thread thereby, creating flank-to-flank contact of the threaded invention. If only the spiral tension flanks are engaged, then a torque shoulder area must carry the compression loading while the thread body carries the tension loading.

Axial spacing between the tension flanks and the compression flanks on at least one of the radially inner and radially outer spiral threads defines a stress reducing spiral root surface spaced radially from a corresponding spiral crest surface on the other radially inner and radially outer spiral threads by at least 0.010 inches. The stress reducing spiral root surface axially spaced between the compression flank of one thread and the tension flank of an adjoining thread includes, in cross-section, a substantially linear profile root surface and first and second axially spaced rounded surfaces, each connecting the linear profile root surface with a corresponding compression flank and tension flank. In one embodiment of the present invention, the linear profile stress reducing root surface is substantially parallel to a plane formed by an angle of the thread taper relative to the axis of the pair of interlocking threaded members.

One of the pair of interlocking threaded members additionally may include an annular torque shoulder for sealing engagement with the corresponding annular stop surface on the other of the pair of interlocking threaded members. Additionally, the annular torque shoulder is adjacent a first radially inner spiral thread and has a reverse angle such that a radially inward portion of the torque shoulder is axially closer to the first thread than a radially outward portion of the torque shoulder.

An axial length of the linear profile root surface defines a thread root width spaced between theoretical intersections of the linear profile root surface with both the compression flank and the tension flank. Each first and second rounded surface connecting the linear profile root surface with an adjoining flank of the thread has a radius from 10% to 50% of the thread root width for improving fatigue resistance during cyclic loading of the connected oilfield tubulars.

In one embodiment of the present invention, the first and second axially spaced rounded surfaces each include approximately an equal radius. Additionally, at least one radially outer spiral thread made include a plastic sealing ring for improved sealing engagement with a corresponding radially inner spiral thread in threaded connections used in highly pressurized downhole environments.

According to the method of the present invention, a pair of tubular bodies are formed, each having a longitudinal passage therethrough and including a radially inner spiral threads on each distal end of each tubular body, each spiral thread including a spiral compression flank and spiral tension flank.

In one embodiment, a coupling body is formed to include radially outer spiral threads on each of a distal end of the coupling body, each spiral thread including a spiral compression flank and spiral tension flank, and at least one of the spiral compression flanks and spiral tension flanks on the inner spiral threads of a pair of tubular bodies being in mating planar engagement with the corresponding spiral compression flank and spiral tension flank on the outer spiral threads of the coupling body. Preferably a flank-to-flank contact is accomplished by the mating planar engagement of both corresponding spiral compression and spiral tension flanks on each of the radially inner and radially outer spiral threads. However, in the event flank-to-flank contact is not achieved and a clearance is created between two corresponding compression flanks, a torque shoulder may carry the compressive loading while the thread body carries the remaining tensile loading.

Axial spacing is then formed between the tension flank and the compression flanks on at least one of the radially inner and radially outer spiral threads that defines a stress reducing spiral root surface spaced radially from a corresponding spiral crest surface on the other radially inner and radially outer spiral threads. The stress reducing spiral root surface is spaced axially between the compression flank of one thread and the tension flank of an adjoining thread and includes, in cross-section, a substantially linear profile root surface and first and second axially spaced rounded surfaces each connecting the linear profile root surface with a corresponding compression flank and tension flank. The axial length of the linear profile root surface defines a thread root width spaced axially between theoretical intersections of the linear profile root surface with both the compression flank and tension flank. Each first and second rounded surface includes a radius from 10% to 50% of the thread root width.

Finally, a threaded coupling may be attached to a distal end of each of the pair of tubular bodies for interconnecting the tubular bodies andfor improving fatigue resistance to cyclic loading exerted on the threaded connection.

It is therefore an object of the present invention to provide a threaded connection capable of reducing the points of concentrated stress in the thread root radii by deepening the thread root depth and increasing the radii to allow the threaded connection to carry the majority of the cyclic loading across the engaged threaded connection.

It is another object of the present invention to provide flank to flank contact between each respective flank on the radially inner and radially outer spiral threads of the threaded connection for stabilizing movement from tension/compression cycling, and providing more support in the threaded connection during compressive and tensile loading.

Yet another object of the invention is to provide flank to flank contact between each respective flank on the radially inner and radially outer spiral threads of the threaded connection for providing resistance to shear forces.

Still another object of the present invention is to provide a threaded connection having a stress reducing spiral root surface on at least one of the radially inner and radially outer spiral threads defining, in cross-section, a width having a substantially linear profile root surface spaced axially between theoretical intersections of the linear profile root surface with both the compression flank and tension flank. Each first and second rounded surface has a radius from 10% to 50% of the thread root width for improving fatigue resistance to cyclic loading exerted on the threaded connection.

It is a feature of the present invention to provide a threaded connection capable of maintaining an equal strength rating whether under tensile or compressive loads.

It is another feature of the present invention to provide a threaded connection having an internal metal seal generated by radial interference between a stop surface and an internal torque shoulder for position control during multiple make-ups, and for reducing the effects of tensile load and pipe body internal pressure.

It is another feature of the present invention to provide a plastic sealing ring within the threaded connection that is equal to the pipe body in internal and collapsed pressure ratings.

It is an advantage of the present invention that the threaded connection may have tensile strength that is substantially equal to or is greater than the pipe body.

These and further objects, features, and advantages of the present invention will become apparent from the following detailed description, wherein reference is made to the figures in the accompanying drawings.

DETAILED DESCRIPTION OF THE PREFERRED EMBODIMENT

Figures 1, 1A:
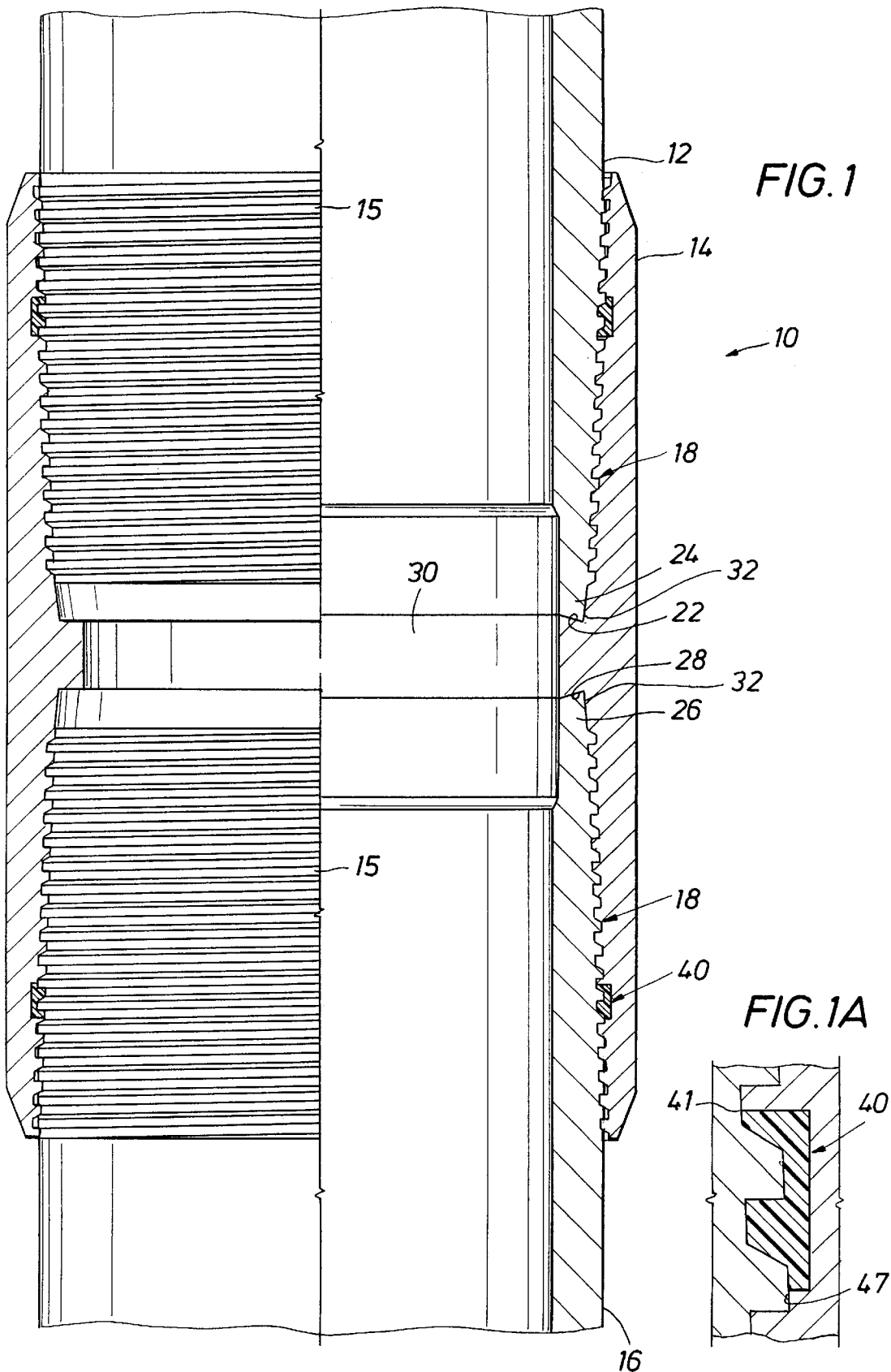
FIG. 1 is a partial longitudinal cross-section of the preferred embodiment.
FIG. 1A is an enlarged view of a sealing ring embedded in the radially outer threads of FIG. 1.

With reference to FIG. 1, a preferred embodiment of the tubular threaded connection 10 is shown for improving fatigue resistance to cyclic loading of threadably connected oilfield tubulars. The threaded connection 10 is generally described as a coupled connection consisting of a pair of tubular threaded pin members 12 having radial inner spiral threads 15 thereon and connected to a tubular threaded coupling body 14 having radially outer spiral threads 18 thereon. Alternatively, the threaded connection 10 may incorporate a plurality of threaded tubular members each having one externally threaded distal end (pin) and another internally threaded end (box) for interlocking the tubular members utilizing the threaded connection 10 of the present invention.

The coupling body 14 forms an upper 22 and lower 28 torque shoulder that acts as a positive stop for positioning a corresponding distal end of the upper pin member 24 and lower pin member 26. The upper 22 and lower 28 torque shoulders form a reverse angle of approximately 15° such that a radially inward portion of the torque shoulders is axially closer to the radially outer spiral threads 18 than a radially outward portion of the torque shoulders. A metal ring 30 is formed between the upper 22 and lower 28 torque shoulders that substantially coincides with the internal diameter of the distal ends 24 and 26 of pin members 12, thereby creating a metal-to-metal seal 32.

With reference to FIGS. 1 and 1A, a sealing ring 40 is circumferentially disposed around one or more of the radially inner spiral threads 15 for improved internal and external pressure resistance. The sealing ring 40 has internal and collapse pressure ratings equal to the pipe body ratings and is easily replaceable. Sealing ring 40 is made up into the radially outer spiral threads 18 of the coupling body 14 and more particularly, from a mid point 41 on the crest of the radially outer spiral threads 18 to a mid point 47 on the root of the radially outer spiral threads 18. Sealing ring 40 is positioned in a cavity (not shown) within the radially outer spiral threads 18 and radially extends from the longitudinal axis of the threaded connection 10 to a point adjacent the outer diameter of the coupling body 14.

Figure 2:
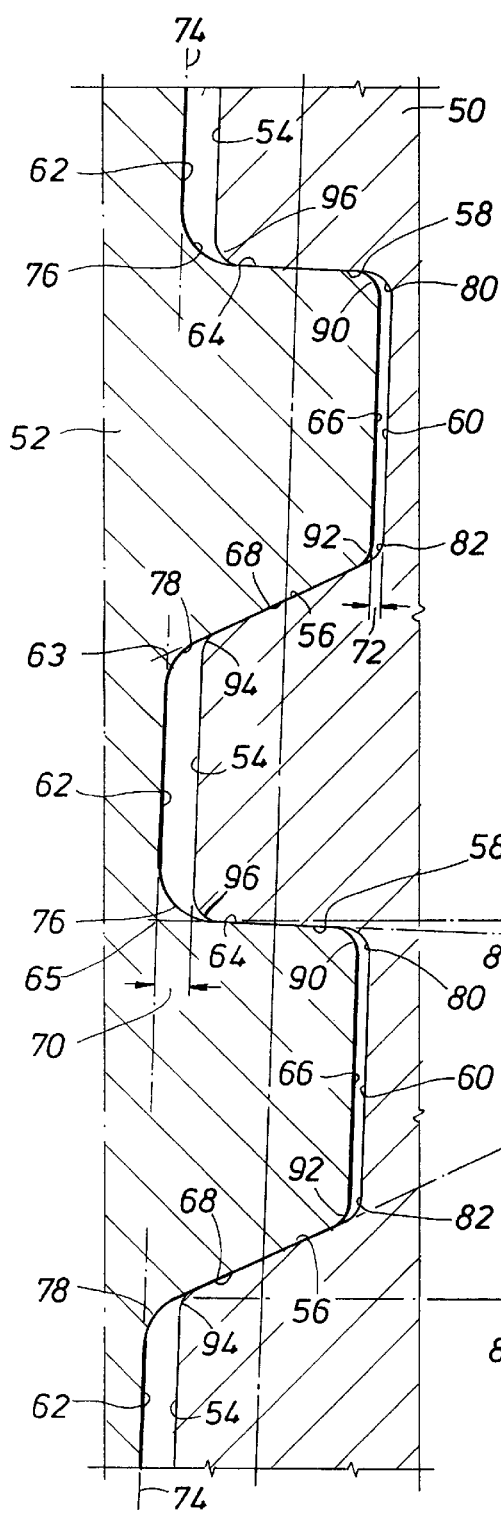
FIG. 2 is an enlarged view of the threaded connection of FIG. 1.

With reference now to FIG. 2, an enlarged view of a preferred embodiment of the threaded connection is shown. Radially inner spiral threads 52 are a modified thread form having a root 62, a tension load flank 64 and compression load flank 68 that is in mating planar engagement with a corresponding tension load flank 58 and compression load flank 56 of the radially outer spiral threads 50 for additional support within the threaded connection and reduced movement from tension/compression cycling. The majority of the cyclic loading, whether tensile, compressive, or shear, is carried across the engaged tension and compression load flanks of the radially outer spiral threads 50 and the radially inner spiral threads 52.

Axial spacing between the tension load flank 64 and compression load flank 68 of the radially inner spiral threads 52 defines alternating crest surfaces 66 and stress reducing root surfaces 62. First 76 and second 78 axially spaced rounded surfaces each connect the stress reducing root surface 62 with a corresponding compression load flank 68 and tension load flank 64. The stress reducing root surface 62 has a substantially linear cross section profile and is parallel 74 to a plane formed by an angle of the thread taper relative to an axis of the pair of interlocking threaded members. An axial length of the root surface 62 defines a thread root width spaced between theoretical intersections 63 and 65 of the linear stress reducing root surface with both the compression load flank 68 and tension load flank 64. Each first 76 and second 78 rounded surface have a radius that is approximately 18% of the thread root width for improving fatigue resistance to improving cyclic loading exerted on the threaded members. Each radius, however, may be enlarged or reduced from anywhere between 10% to 50% of the thread root width, depending upon changing tension or sealing requirements. The crest surface 66 may be linear on non-linear.

Larger and smoother radii improve fatigue resistance in transition areas of structural members. For example, a direct correlation exists between the stress concentration factor (Kt) and the size of the radius. According to the third edition of "Mechanical Engineering Design" by Schigley, stress concentration for a stepped round shaft having a shoulder fillet and applied bending moment is approximated by:

$$K_t = 1.68 + 1.24 \cos^{-1}(d/D) - (r/d)[2.82 + 11.6 \cos^{-1}(d/D)] + (r/d)2[5.71 + 29.6 \cos^{-1}(d/D)]$$

Although the foregoing equation is not specifically designed for threaded pipe, it is equally applicable since stress concentration factors have been found to be lower in threaded shafts than shafts with a shoulder radius or with a single groove, applying a bending moment. Therefore, by increasing the radius the stress concentration factor is reduced.

The radii of each first 76 and second 78 rounded surface allow cyclic loading to be distributed over the radially outer 50 and radially inner 52 spiral threads rather than being concentrated at what normally would be a sharp juncture formed in the root of the thread. Although the preferred embodiment utilizes rounded surfaces having equal radii, the rounded surfaces may have different radii depending of the design fit between the two mating radially outer 50 and radially inner 52 spiral threads, provided the same are within 10%–50% of the thread root width.

Enlarging the radii on the first 76 and second 78 rounded surfaces requires a reduction in the interior wall thickness adjacent the radially inner spiral threads 52, thereby creating a radial clearance 70 of approximately 0.014 inches between the crest surface 54 and the stress reducing root surface 62. Although a preferred embodiment clearance 70 is approximately 0.014 inches, the clearance may be larger or smaller depending upon the size of the radius on the first 76 and second 78 rounded surfaces. Axial spacing between the tension load flank 58 and compression load flank 56 on the radially outer spiral threads 50 defines alternating crest surfaces 54 and root surfaces 60, each having a substantially linear cross-section profile. Crest surface 54 may, however, be non-linear. An outer clearance 72 of 0.004 inches is created between the root surface 60 and crest surface 66. The root surface 60 intersects the compression load flank 56 and tension load flank 58 along corresponding third 80 and fourth 82 axially spaced rounded surfaces, each defining a sharp juncture having a radius of approximately 0.008 inches. Alternatively, the radii on the third 80 and fourth 82 rounded surfaces may be enlarged from anywhere between 10% to 50% of a thread root width similarly defined by an axial length of the linear root surface 60 and the theoretical intersections of the linear root surface 60 with both the compression load flank 56 and tension load flank 58.

Although enlarging the radii on either root surface reduces tension strength in the threaded connection, the reduction in tensile strength is negligible for applications utilizing the threaded connection in tubing, casing and riser connections. Moreover, shear strength is not sacrificed by the modified threaded connection of the present invention. Consequently, the balance between reduced load bearing capacity and improved fatigue resistance results in a radius of approximately 18% of the thread root width. However, thread forms of a different optimal radius may be in the range of 10% to 50% at the thread root width, preferably in the range of 14% to 34% at the thread root width, and still more preferably in the range from 16% to 26% of the thread root width.

The crest surface 66 intersects the tension load flank 64 and compression load flank 68 along corresponding rounded surfaces 90 and 92 and crest surface 54 intersects the tension loan flank 58 and compression load flank 56 along corresponding rounded surfaces 94 and 96 for an interference fit between the radially inner 52 and radially outer 50 spiral threads. As shown in FIG. 2, the radius on the first and second rounded surfaces 76 and 78 is substantially greater than a radius on the corresponding rounded surfaces 96 and 94, respectively.

In a preferred embodiment, the engagement between the tension load flank 58 and the tension load flank 64 forms a plane 84 that creates an angle 85 projecting away from the spiral compression flank in a radially outward direction that is less than 7° and is preferably 3° from a plane 83 perpendicular to the longitudinal axis of the threaded connection in FIG. 2. The 3° mating tension load flanks provide optimum tensile strength without the cost of a reverse angle or "hooked" thread design.

A plane 88 formed by the mating engagement of compression load flank 68 and compression load flank 56 forms an angle 86 that is less than 30° and is preferably 25° from a plane 87 that is perpendicular to the longitudinal axis of the threaded connection in FIG. 2. The 25° mating compression load flanks reduce cross-threading.

Figure 3:
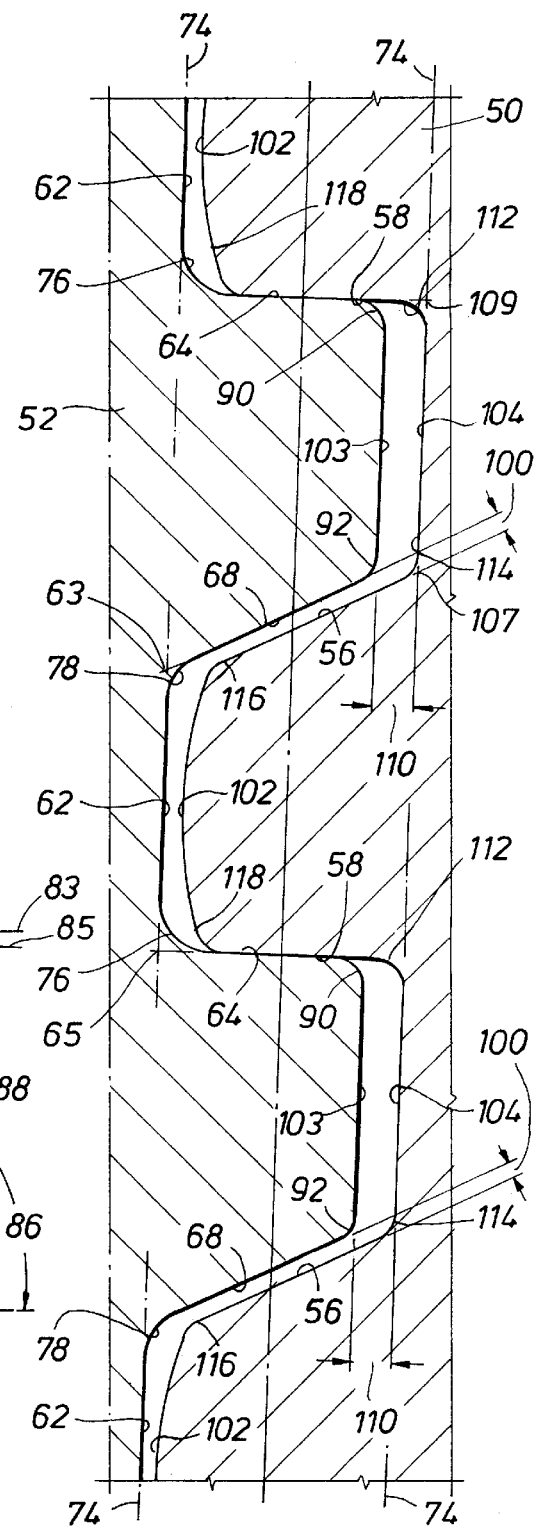
FIG. 3 is an enlarged longitudinal cross-sectional view of an alternative embodiment of the present invention.

With reference now to FIG. 3, an alternative embodiment of the threaded connection is depicted by partially interlocking radially inner spiral threads 52 and radially outer spiral threads 50. The radially inner spiral threads 52 include a tension load flank 64 and compression load flank 68 axially separated by alternating crest surfaces 103 that have a substantially linear cross-section profile, and a stress reducing root surface 62 also having a substantially linear cross-section profile that is substantially parallel 74 to a plane formed by an angle of the thread taper relative to an axis of the pair of interlocking threaded members. The linear stress reducing root surface 62 intersects the compression load flank 68 and tension load flank 64 along corresponding first 76 and second 78 axially spaced rounded surfaces.

The axial length of the linear stress reducing root surface 62 defines a thread root width spaced between theoretical intersections 63 and 65 of the linear stress reducing root surface with both the compression load flank 68 and tension load flank 64. Each first 76 and second 78 rounded surface has a radius that is 18% of the thread root width for improving fatigue resistance to cyclic loading exerted on the threaded members. Each radius, however, may also be enlarged or reduced from anywhere 10% to 50% of the thread root width, and preferably from 16% to 26% of the thread root width, depending upon changing tension or sealing requirements.

The radially outer spiral threads 50 include a compression load flank 56 and a tension load flank 58 axially separated by an alternating crest surface 102 that is substantially non-linear, and a stress reducing root surface 104 that also includes a substantially linear cross-section profile that is substantially parallel 74 to a plane formed by an angle of the thread taper relative to an axis of the pair of interlocking threaded members. The linear stress reducing root surface 104 intersects the compression load flank 58 and tension load flank 56 along corresponding third 112 and fourth 114 rounded surfaces.

The axial length of the linear stress reducing root surface 104 defines a thread root width spaced between theoretical intersections 107 and 109 of the linear stress reducing root surface with both the compression load flank 58 and tension load flank 56. Each third 112 and fourth 114 rounded surface has a radius that is 18% of the thread root width for improving fatigue resistance to cyclic loading exerted on the threaded members or 0.18 inches. Each radius, however, may also be enlarged or reduced within the range described above for the first and second rounded surfaces, depending upon changing tension or sealing requirements. Although the radii or the third 112 and fourth 114 rounded surfaces may be equal, they may have a different radius.

Enlarging the radii on the third 112 and fourth 114 rounded surfaces creates a radial clearance 110 of 0.14 inches between the crest surface 103 and stress reducing root surface 104. Although clearance 110 is 0.14 inches it may vary depending upon the size of the radius on the third 112 and fourth 114 rounded surfaces, however, is at least 0.010 inches.

A clearance 100 is defined between compression load flank 56 on the radially outer spiral threads 50 and compression load flank 68 on radially inner spiral threads 52 which communicates with radial clearance 110 and the clearance defined between the stress reducing root surface 62 and crest surface 102. The clearance 100 depends upon the corresponding widths of the substantially linear crest surface 103 and substantially non-linear crest surface 102. The corresponding torque shoulders 22 and 28 in FIG. 1 must carry the compression loading while the thread body carries the remaining tension loading since there is a clearance 100 between the compression load flanks.

In either embodiment of FIG. 2 or FIG. 3, the clearances may be sealed by any thread compound to prevent leakage. Additionally, since a minimal degree of tensile strength is sacrificed by enlarging the root surface of either the radially outer spiral threads, the radially inner spiral threads, or both, the standard coupling outside diameter may be varied for each application to provide tensile strength commensurate with the pipe body. Thus, the larger the clearance is between the stress reducing root surface and corresponding crest, the larger the outside diameter needs to be in order to maintain tensile strength.

Various additional modifications to the threaded connection described herein should be apparent from the above description of the preferred embodiments. Although the invention has thus been described in detail for these embodiments, it should be understood that this explanation is for illustration, and that the invention is not limited to the described embodiments. Alternative components and operating techniques should be apparent to those skilled in the art in view of this disclosure. Modifications are thus contemplated and may be made without departing from the spirit of the invention, which is defined by the claims.

What is claimed is:

1. An oilfield tubular threaded connection for enhancing fatigue resistance to cyclic loading of threadably connected oilfield tubulars, the threaded connection comprising:

a pair of interlocking threaded members having corresponding radially inner and radially outer spiral threads thereon, each spiral thread including a spiral compression flank and a spiral tension flank, the spiral tension flank on the inner spiral threads being in mating planar engagement with a corresponding spiral tension flank on the outer spiral thread;

an axial spacing between the tension flanks and the compression flanks on at least one of the radially inner and radially outer spiral threads defining a stress reducing spiral root surface spaced radially from a corresponding spiral crest surface on the other radially inner and radially outer spiral threads, said stress reducing spiral root surface spaced axially between the compression flank of one thread and the tension flank of an adjoining thread including in cross section a substantially linear profile root surface and a first rounded surface connecting the linear profile root surface with a corresponding tension flank and a second rounded surface connecting the linear profile root surface with a corresponding compression flank, an axial length of the linear profile root surface defining a thread root width spaced between theoretical intersections of the linear profile root surface with both the compression flank and the tension flank, each first and second rounded surface having a radius that is 10% to 50% of the thread root width; and the radius of the first rounded surface being substantially greater than a radius of another first rounded surface connecting the corresponding spiral crest surface with the tension flank on the outward spiral threads to minimize engagement between the first rounded surface and the another first rounded surface thereby reducing stress concentration from applied loads exerted on said threaded members during loading of said connected oilfield tubulars.

2. The oilfield tubular threaded connection of claim 1, wherein the stress reducing root surface is provided on the radially inner spiral thread.

3. The oilfield tubular threaded connection of claim 2, wherein the radially outer spiral thread has another stress reducing spiral root surface spaced axially between the compression flank of the one thread and the tension flank of the adjoining thread including in cross-section another substantially linear profile root surface and third and fourth axially spaced rounded surfaces each connecting the another substantially linear profile root surface with a corresponding compression flank and tension flank, an axial length of the another linear profile root surface defining another thread root width spaced between theoretical intersections of another linear profile root surface with both the compression flank and tension flank, each third and fourth rounded surface having a radius that is 10% to 50% of the another thread root width for reducing stress concentration from applied loads exerted on said threaded members during loading of said connected oilfield tubulars.

4. The oilfield tubular threaded connection of claim 1, wherein each first and second rounded surface has a radius that is 14% to 34% of the thread root width for reducing stress concentration from applied loads exerted on said threaded members during loading of said connected oilfield tubulars.

5. The oilfield tubular threaded connection of claim 1, wherein each first and second rounded surface has a radius that is 16% to 26% of the thread root width for reducing stress concentration from applied loads exerted on said threaded members during loading of said connected oilfield tubulars.

6. The oilfield tubular threaded connection of claim 1, wherein the first and second axially spaced rounded surfaces each have approximately an equal radius.

7. The oilfield tubular threaded connection of claim 1, wherein the stress reducing spiral root surface is spaced radially from the corresponding spiral crest surface by a radial spacing of at least 0.010 inches.

8. The oilfield tubular threaded connection of claim 1, wherein both the spiral compression flank and spiral tension flank on the radially inner spiral thread are in mating planar engagement with the corresponding spiral compression flank and spiral tension flank on the radially outer spiral thread.

9. The oilfield tubular threaded connection of claim 1, wherein the spiral compression flank on each of the radially inner and radially outer spiral threads forms an angle less than 30° with respect to a plane perpendicular to an axis of the pair of interlocking threaded members.

10. The oilfield tubular threaded connection of claim 1, wherein the spiral tension flank of each radially inner and radially outer spiral threads forms an angle less than 7° with respect to a plane perpendicular to an axis of the pair of interlocking threaded members.

11. The oilfield tubular threaded connection of claim 1, wherein the linear profile of the stress reducing root surface is substantially parallel to a plane formed by an angle of a thread taper relative to an axis of the pair of interlocking threaded members.

12. The oilfield tubular threaded connection of claim 1, wherein one of the pair of interlocking threaded members includes an annular torque shoulder for sealing engagement with a corresponding annular stop surface on the other of the pair of interlocking threaded members.

13. The oilfield tubular threaded connection of claim 12, wherein the annular torque shoulder is adjacent to a first radially inner spiral thread and has a reverse angle such that a radially inward portion of the torque shoulder is axially closer to the first thread than a radially outward portion of the torque shoulder.

14. The oilfield tubular threaded connection of claim 1, further comprising:

a plastic sealing ring for sealing engagement between a radially outer threaded member and a corresponding radially inner spiral thread.

15. An oilfield tubular threaded connection for improved fatigue resistance to cyclic loading of threadably connected oilfield tubulars comprising:

a pair of tubular bodies each having a longitudinal passage there through and including radially inner spiral threads on each of a distal end of each tubular body, each spiral thread including a spiral compression flank forming an angle less than 30° with respect to a plane perpendicular to a longitudinal axis of the pair of tubular bodies and a spiral tension flank projecting axially away from the spiral compression flank and forming an angle less than 7° with respect to the plane perpendicular to the axis of the pair of tubular bodies;

a coupling body threadably connected to a distal end of each of the pair of tubular bodies and having a longitudinal passage there through, including radially outer spiral threads on each of a distal end of the coupling body, each spiral thread including a spiral compression flank and a spiral tension flank, the spiral tension flank on the inner spiral threads of the pair of tubular bodies being in mating planar engagement with the corresponding spiral tension flank on the outer spiral threads of the coupling body; and an axial spacing between the tension flanks and the compression flanks on at least one of the radially inner and radially outer spiral threads defining a stress reducing spiral root surface spaced radially from a corresponding spiral crest surface on the other radially inner and radially outer spiral threads, said stress reducing spiral root surface spaced axially between the compression flank of one thread and the tension flank of an adjoining thread including in cross-section a substantially linear profile root surface and first and second axially spaced rounded surfaces each connecting the linear profile root surface with a corresponding compression flank and tension flank, an axial length of the linear profile root surface defining a thread root width spaced between theoretical intersections of the linear profile root surface with both the compression flank and the tension flank, each first and second rounded surface having a radius that is 10% to 50% of the thread root width for reducing stress concentration from applied loads exerted on said threaded connection during loading of said connected oilfield tubulars.

16. The oilfield tubular threaded connection of claim 15, wherein the stress reducing root surface is provided on the radially inner spiral thread.

17. The oilfield tubular threaded connection of claim 16, wherein the radially outer spiral thread has another stress reducing spiral root surface spaced axially between the compression flank of the one thread and the tension flank of the adjoining thread including in cross-section another substantially linear profile root surface and third and fourth axially spaced rounded surfaces each connecting the another substantially linear profile root surface with a corresponding compression flank and tension flank, an axial length of the another linear profile root surface defining another thread root width spaced between theoretical intersections of another linear profile root surface with both the compression flank and tension flank, each third and fourth rounded surface having a radius that is 10% to 50% of the another thread root width for reducing stress concentration from applied loads exerted on said threaded during loading of said connected oilfield tubulars.

18. The oilfield tubular threaded connection of claim 15, wherein the first and second axially spaced rounded surfaces each have an approximately equal radius.

19. The oilfield tubular threaded connection of claim 15, wherein the stress reducing spiral root surface is spaced radially from the corresponding spiral crest surface by a radial spacing of at least 0.010 inches.

20. A method for producing a threaded connection for reducing bending stresses in threadably connected oilfield tubulars comprising:

forming a pair of tubular bodies each having a longitudinal passage there through, and including radially inner spiral threads on each distal end of each tubular body, each spiral thread including a spiral compression flank and spiral tension flank;

forming a coupling body having a longitudinal passage there through, and including a radially outer spiral thread on each of a distal end of the coupling body, each spiral thread including a spiral compression flank and a spiral tension flank, the spiral tension flank on the inner spiral threads of the pair of tubular bodies being in mating planar engagement with the corresponding spiral tension flank on the outer spiral threads of the coupling body;

forming an axial spacing between the tension flanks and the compression flanks on at least one of the radially inner and radially outer spiral threads to define a stress reducing spiral root surface spaced radially from a corresponding spiral crest surface on the other radially inner and radially outer spiral threads, said stress reducing spiral root surface spaced axially between the compression flank of one thread and the tension flank of an adjoining thread including in cross-section a substantially linear profile root surface and a first rounded surface connecting the linear profile root surface with a corresponding tension flank and a second rounded surface connecting the linear profile root surface with a corresponding compression flank, an axial length of the linear profile root surface defining a thread root width spaced between theoretical intersections of the linear profile root surface with both the compression flank and the tension flank, each first and second rounded surface having a radius that is 10% to 50% of the threaded root width, the radius of the first rounded surface being substantially greater than a radius of another first rounded surface connecting the corresponding spiral crest surface with the tension flank on the outer spiral threads to minimize engagement between the first rounded surface and the another first rounded surface thereby reducing stress concentration from applied loads exerted on said threaded connection during loading of said connected oilfield tubulars; and attaching the coupling body to a distal end of each of the pair of tubular bodies.

* * * * *